United States Patent
Beals et al.

(10) Patent No.: US 9,237,043 B1
(45) Date of Patent: Jan. 12, 2016

(54) METHOD AND APPARATUS TO PROVIDE SIMULTANEOUS SENSING AND TRANSMISSION FOR DYNAMIC SPECTRUM ACCESS

(71) Applicant: Raytheon Company, Waltham, MA (US)

(72) Inventors: Mark J. Beals, Fort Wayne, IN (US); David E. Mussmann, Spencerville, IN (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 14/475,931

(22) Filed: Sep. 3, 2014

(51) Int. Cl.

| H03D 1/04 | (2006.01) |
|---|---|
| H03D 1/06 | (2006.01) |
| H03K 5/01 | (2006.01) |
| H03K 6/04 | (2006.01) |
| H04B 1/10 | (2006.01) |
| H04L 1/00 | (2006.01) |
| H04L 25/08 | (2006.01) |
| H04L 25/03 | (2006.01) |
| H04B 1/12 | (2006.01) |

(52) U.S. Cl.
CPC .......... *H04L 25/03828* (2013.01); *H04B 1/126* (2013.01)

(58) Field of Classification Search
CPC .................. H04L 25/03828; H04L 25/03885; H04L 25/03821; H04B 1/126
USPC ......... 375/346, 285, 350, 351, 229, 230, 231, 375/232
See application file for complete search history.

(56) References Cited

U.S. PATENT DOCUMENTS

| 7,027,592 B1* | 4/2006 | Straussnigg et al. ...... 379/406.08 |
|---|---|---|
| 8,249,540 B1 | 8/2012 | Gupta et al. |
| 2010/0159858 A1 | 6/2010 | Dent et al. |
| 2010/0165956 A1 | 7/2010 | Razzell |
| 2011/0143655 A1* | 6/2011 | Ahn et al. .......................... 455/9 |
| 2013/0021914 A1 | 1/2013 | Alapuranen |

FOREIGN PATENT DOCUMENTS

| CN | 101719806 A | 6/2010 |
|---|---|---|
| WO | WO 97/40608 | 10/1997 |
| WO | WO 2007/063514 A2 | 6/2007 |
| WO | WO 2007/063528 A2 | 6/2007 |
| WO | WO 2012/114700 A1 | 8/2012 |

\* cited by examiner

*Primary Examiner* — Phuong Phu

(74) *Attorney, Agent, or Firm* — Daly, Crowley, Mofford and Durkee, LLP

(57) ABSTRACT

A multicarrier radio frequency (RF) transceiver implementing dynamic spectrum access (DSA) is capable of sensing a spectral environment and transmitting an RF signal at the same time. The transceiver can cancel an RF transmit signal component within a composite receive signal using a combination of analog and digital cancellation. In one embodiment, analog RF cancellation is performed to reduce the level of a transmit signal component of a composite receive signal before the signal reaches an RF receiver. The RF cancellation may be used to reduce the transmit signal component to a level that maintains the linear operation of the RF receiver. Digital cancellation may be performed to reduce transmit signal remnants within an output signal of the RF receiver. Digital cancellation may be performed on a subcarrier-by-subcarrier basis in some implementations.

27 Claims, 7 Drawing Sheets

METHOD AND APPARATUS TO PROVIDE SIMULTANEOUS SENSING AND TRANSMISSION FOR DYNAMIC SPECTRUM ACCESS

BACKGROUND

Dynamic spectrum access (DSA) and dynamic spectrum management (DSM) are terms that refer to systems and techniques for dynamically allocating spectral resources to users in an efficient manner. In some systems implementing DSA, individual communication devices may have the ability to monitor a spectral environment about the device and to adapt their transmit parameters (e.g., frequency, power, modulation, timing, etc.) to that environment in an efficient manner that ensures a desired level of communication quality. Cognitive radio systems are one example of communication devices that make use of DSA principles to make more efficient use of spectral resources and adapt to a changing electromagnetic environment.

In conventional systems implementing DSA, the spectral environment about a device is sensed during periods when a radio frequency (RF) transmitter within the device is idle. This is because signals transmitted from the RF transmitter will typically leak into the receiver front end and interfere with signal reception if spectral sensing and signal transmission are performed simultaneously. This interference can significantly disrupt the accuracy of the spectral sensing. Because sensing is not permitted during transmission, a conventional radio's knowledge of the wireless channel can be stale after a period of transmission. This fact sometimes requires relatively complex protocols to be used to ensure that fresh channel information is available to a radio. These protocols may require, for example, that fresh information be received from other sources and/or that partial channel information be used. Information from other sources is often of limited value as other nodes do not necessarily observe the channel in the same way that the radio of interest does. Likewise, partial channel information can be of limited value as it may not include the data needed to make quality decisions regarding transmit parameters. As will be appreciated, inaccurate, stale, or incomplete channel information can lead to collisions in the channel in a system implementing DSA.

There is a need for techniques for ensuring that fresh channel information is available within a radio implementing DSA. This may be accomplished by, for example, providing a radio that is capable of simultaneously transmitting RF signals and sensing an electromagnetic environment.

SUMMARY

Systems, techniques, and concepts are described herein that allow electromagnetic spectrum monitoring and RF signal transmission to be performed simultaneously from a common platform in a common frequency band. The systems, techniques, and concepts are capable of implementation in wideband systems and may be used within multicarrier systems, including systems implementing orthogonal frequency division multiplexing (OFDM). Simultaneous transmission and monitoring is achieved using a multi-stage transmit signal cancellation approach with both analog RF cancellation and digital cancellation. In some embodiments, the analog RF cancellation is performed in manner that reduces the magnitude of the RF receive signal to a level that maintains the linearity of an RF receiver. The digital cancellation may be performed after the RF receiver processing. In a multicarrier system, the digital cancellation may be performed on a sub-carrier by subcarrier basis. To further enhance operation, a degree of physical separation may be maintained between transmit and receive antennas within a system.

In some embodiments, independent digital cancellation is performed on individual sub-carriers in a wideband OFDM signal. In addition, in some implementations, RF cancellation is performed using separate nulls that are created using different delays. These nulls may be spaced in frequency to provide, for example, 30-35 dB cancellation across an extended bandwidth (e.g., a full 20 MHz bandwidth in one implementation). The RF cancellation (and possibly other isolation mechanisms, such as antenna separation, etc.) may be used to keep the receiver sufficiently linear to enable the remainder of the interference to be cancelled with digital processing.

Cognitive radio systems are currently increasing in popularity, building on the success of software defined radios (SDRs). Techniques and systems described herein permit DSA to be achieved in a full-duplex (simultaneous transmit and receive or STAR) radio. This improves system awareness of the RF environment dramatically over the conventional sense-when-not-transmitting strategy. Digital cancellation depends on the orthogonality of sub-carriers to allow them to be cancelled independently. It therefore works best when RF receiver operation is relatively linear. Therefore, in some embodiments, the RF cancellation is performed in a manner that ensures the linearity of the RF receiver. Calibration of the cancellation system can be static and off-line, or dynamic and automatic. The calibration process may allow the digital canceller to account for the upstream RF cancellation effects and potentially variable coupling between channels and across the multiple sub-carriers.

In accordance with one aspect of the concepts, systems, circuits, and techniques described herein, a method comprises: obtaining baseband transmit data; generating a multicarrier transmit signal using the baseband transmit data; transmitting the multicarrier transmit signal from a transmit antenna; receiving a composite receive signal at a receive antenna, the composite receive signal having a component associated with the multicarrier transmit signal; performing analog RF cancellation to reduce a level of the multicarrier transmit signal component of the composite receive signal to generate an RF cancelled receive signal; processing the RF cancelled receive signal in an RF receiver to generate a digital receive signal; and performing digital cancellation on the digital receive signal to reduce remnants of the multicarrier transmit signal therein, wherein performing digital cancellation includes performing cancellation on a subcarrier by subcarrier basis.

In one embodiment, performing analog RF cancellation includes cancelling a sufficient portion of the multicarrier transmit signal component of the composite signal to maintain linearity of the RF receiver.

In one embodiment, performing digital cancellation includes modifying amplitudes and phases associated with individual subcarriers of the digital receive signal in accordance with a digital cancellation signal.

In one embodiment, performing digital cancellation includes generating the digital cancellation signal.

In one embodiment, generating the digital cancellation signal includes: (a) acquiring a copy of the baseband transmit data; (b) obtaining a transfer function that is descriptive of transceiver hardware between transmit baseband and receive baseband; and (c) digitally processing the baseband transmit data using the transfer function to generate the digital cancellation signal.

In one embodiment, obtaining a transfer function includes retrieving the transfer function from memory.

In one embodiment, obtaining a transfer function includes generating the transfer function using a calibration procedure.

In one embodiment, performing digital cancellation includes performing digital cancellation for all subcarriers of the digital receive signal.

In one embodiment, performing digital cancellation includes performing digital cancellation for a subset of the subcarriers of the digital receive signal.

In one embodiment, performing analog RF cancellation includes performing cancellation in multiple RF cancellation stages to cover a full bandwidth of the multicarrier transmit signal.

In one embodiment, generating a multicarrier transmit signal includes generating an orthogonal frequency division multiplexing (OFDM) symbol having a predetermined number of data subcarriers.

In accordance with another aspect of the concepts, systems, circuits, and techniques described herein, a method comprises: performing radio frequency (RF) cancellation on a composite receive signal to reduce a multicarrier transmit signal component in the composite receive signal; processing the RF cancelled receive signal in an RF receiver to generate a digital receive signal, wherein performing RF cancellation includes reducing the multicarrier transmit signal component in the composite receive signal a sufficient amount to maintain linear operation in the RF receiver; and performing digital cancellation on the digital receive signal to reduce remnants of the multicarrier transmit signal component in the digital receive signal.

In one embodiment, performing digital cancellation includes performing digital cancellation on a subcarrier by subcarrier basis.

In one embodiment, performing digital cancellation includes generating a digital cancellation signal using a copy of baseband transmit data used to generate a multicarrier transmit signal and a transfer function descriptive of transceiver hardware using to perform RF cancellation.

In accordance with another aspect of the concepts, systems, circuits, and techniques described herein, a transceiver for use in a multicarrier system comprises: a radio frequency (RF) transmitter to generate a multicarrier transmit signal for transmission into a wireless channel using baseband transmit data; a transmit antenna to transmit the multicarrier transmit signal; a receive antenna to receive a composite receive signal from an exterior environment, the composite receive signal having a component associated with the multicarrier transmit signal; an RF canceller to reduce a level of the multicarrier transmit signal component in the composite receive signal to generate an RF cancelled receive signal; an RF receiver to process the RF cancelled receive signal to generate a digital receive signal; and a digital processor configured to perform digital cancellation on the digital receive signal to remove remnants of the multicarrier transmit signal therefrom, wherein the digital cancellation is performed on a subcarrier-by-subcarrier basis.

In one embodiment, the digital processor is configured to generate a digital cancellation signal using a copy of the baseband transmit data used to generate the multicarrier transmit signal and to use the digital cancellation signal to perform the digital cancellation.

In one embodiment, the digital processor is configured to generate the digital cancellation signal by digitally processing the baseband transmit data using a transfer function descriptive of processing hardware within the transceiver.

In one embodiment, the RF canceller is configured to reduce a level of the multicarrier transmit signal component in the composite receive signal to a level that maintains linear operation in the RF receiver.

In one embodiment, the digital processor is configured to perform digital cancellation for all of the data subcarriers of the digital receive signal.

In one embodiment, the transmit antenna and the receive antenna are located a sufficient distance from one another to maintain a desired level of isolation there between.

BRIEF DESCRIPTION OF THE DRAWINGS

The foregoing features may be more fully understood from the following description of the drawings in which.

DETAILED DESCRIPTION

Figure 1:
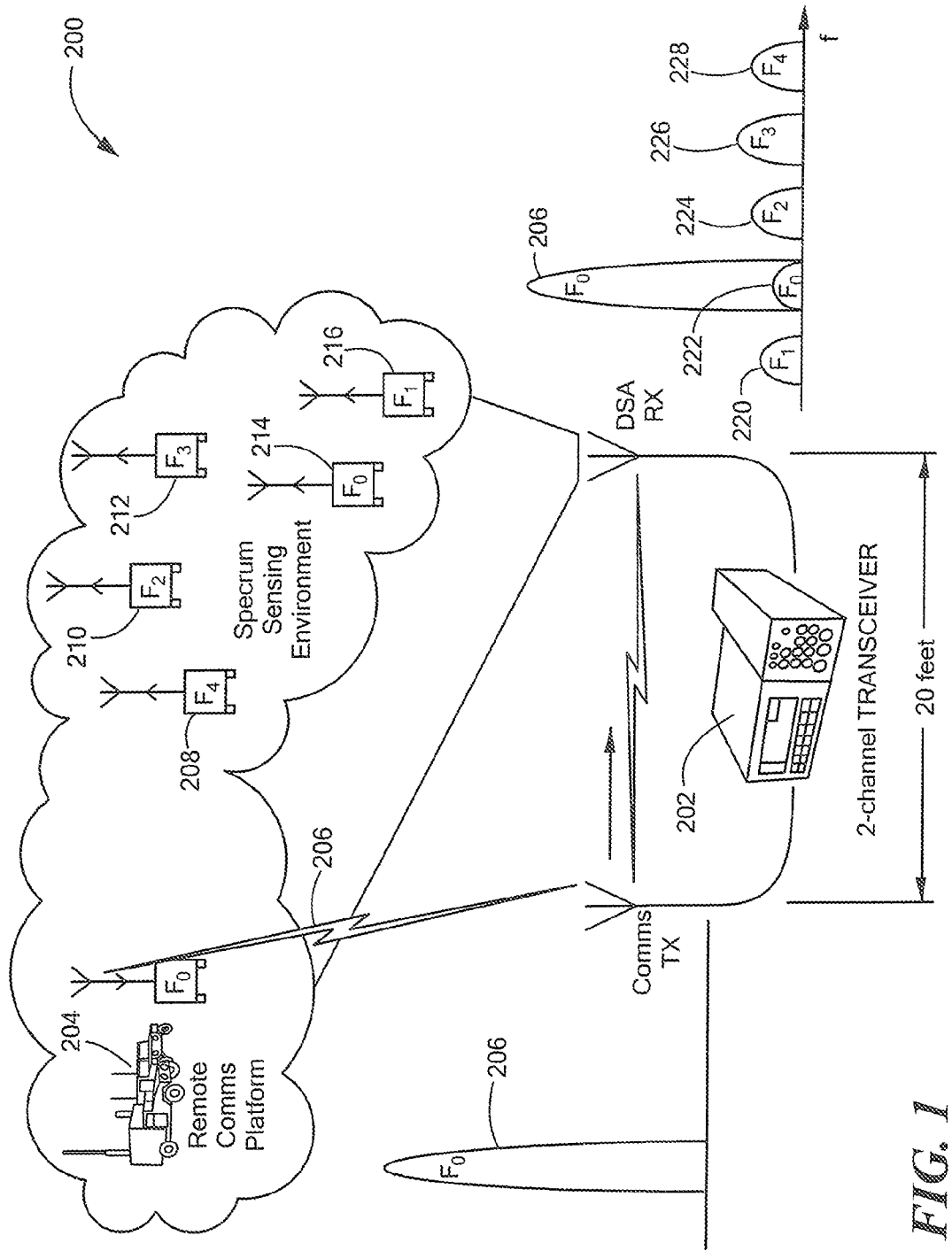
FIG. 1 is a diagram illustrating a communications scenario in which techniques and concepts described herein may be practiced.

FIG. 1 is a diagram illustrating a communications scenario 200 in which techniques and concepts described herein may be practiced. As shown, a 2-channel RF transceiver 202 may desire to communicate with a remote communications platform 204. The RF transceiver 202 and the communications platform 204 may both use multicarrier RF technology (e.g., OFDM, OFDMA, etc.) to communicate wirelessly. In addition to the RF transceiver 202 and the communications platform 204, a number of other wireless nodes 208, 210, 212, 214, 216 may also be operating in the vicinity. To determine transmit parameters to use to communicate with platform 204, the transceiver 202 may use DSA techniques to sense the spectral environment and select transmit parameters based on the result. The RF transceiver 202 may use one of its 2 channels to perform the sensing function and the other to communicate with the platform 204.

While sensing the environment, the transceiver 202 may detect signal energy within a number of different frequency bands (e.g., bands $F_0$, $F_1$, $F_2$, $F_3$, and $F_4$ in the illustrated embodiment). This signal energy may represent transmissions from wireless nodes 208, 210, 212, 214, and 216. This detected signal energy is represented in FIG. 1 by spectral components 220, 222, 224, 226, and 228. Based on the detected energy, the RF transceiver 202 may decide to communicate with the platform 204 in frequency band $F_0$. Other signal parameters may also be selected based on the detected energy. Transceiver 202 may then transmit an RF signal 206 to platform 204 within frequency band $F_0$. The transmit signal 206 may require a relatively large power level in order to reach communication platform 204 with sufficient signal-to-noise ratio (SNR) to be detected and decoded in the corresponding receiver.

While the transceiver 202 is communicating with the platform 204, the electromagnetic environment around the transceiver 202 may be changing. To maintain efficient spectrum utilization, it may be desirable to modify the transmit parameters being used to communicate with the platform 204 based on the changing spectral environment. To do this, the transceiver 202 needs to monitor the spectral environment during operation. As described previously, in conventional systems, the spectrum sensing would be done when the transceiver 202 is not transmitting. This is because a relatively large transmit signal can leak into the receive channel performing the sensing function and mask the signals being sensed. Systems and techniques are provided herein, however, that allow the transceiver 202 to monitor the spectral environment even when transmitting. Thus, with reference to FIG. 1, the transceiver 202 would be able to accurately identify the signal energy associated with spectral components 220, 222, 224, 226, and 228 even in the presence of the transmit signal 206 in band $F_0$.

Figure 2:
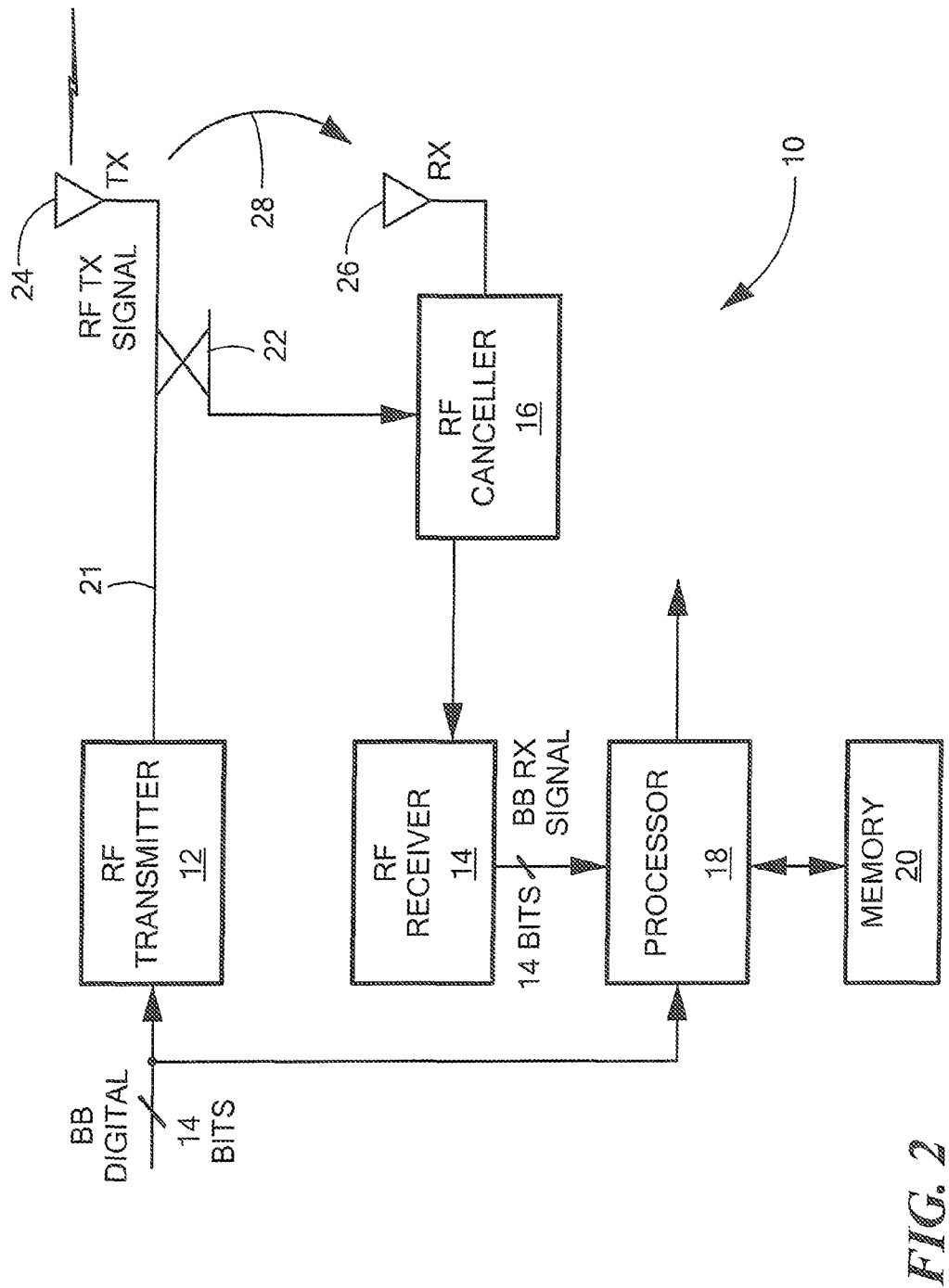
FIG. 2 is a block diagram illustrating an exemplary multicarrier radio frequency (RF) transceiver system in accordance with an embodiment.

FIG. 2 is a block diagram illustrating a multicarrier radio frequency (RF) transceiver system 10 in accordance with an embodiment. As will be described in greater detail, the RF transceiver system 10 is capable of sensing a spectral environment surrounding the transceiver while it is transmitting a multicarrier RF signal to a remote wireless node. The transceiver system 10 accomplishes this by effectively cancelling the portion of the RF transmit signal that makes its way into the sensing receive path of the transceiver 10. In at least one embodiment, a multi-stage transmit signal cancellation process is provided that performs both analog RF cancellation and digital cancelation. The RF transceiver system 10 is well suited for use in systems implementing dynamic spectrum access (DSA) to monitor an electromagnetic environment to determine transmit parameters (e.g., in cognitive radios and the like). Because spectral sensing can be done concurrently with RF signal transmission, communication resources can be used in a more efficient manner, without requiring coordination between users. In some implementations, the transceiver system 10 is capable of full Simultaneous Transmit and Receive (STAR) operation.

Referring now to FIG. 2, the transceiver system 10 may include: a multicarrier RF transmitter 12, a multicarrier RF receiver 14, an RF canceller 16, a digital processor 18, memory 20, an RF coupler 22, a transmit antenna 24, and a receiver antenna 26. The RF transmitter 12 and the transmit antenna 24 may be used to communicate with a remote wireless entity (e.g., remote platform 204 of FIG. 1, etc.). The RF receiver 14 and the receive antenna 26 may be used for sensing the spectral environment. In some implementations, another RF receiver (not shown) may be provided for receiving communications signals from the remote wireless entity and/or other users. The RF transmitter 12 obtains digital baseband data at an input thereof and uses the data to generate a multicarrier RF transmit signal. In some embodiments, orthogonal frequency division multiplexing (OFDM) may be used as a multicarrier signaling scheme, although other forms of multicarrier signaling may alternatively be used. Techniques for generating multicarrier signals using input data are well known in the art. The RF transmit signal is delivered along a transmit path 21 to the transmit antenna 24, where it is launched into free space. In some implementations, one or more RF filters (e.g., a bandpass filter, etc.) may be located within the transmit path 21 to filter the RF transmit signal before it reaches the transmit antenna 24.

The receive antenna 26 senses spectral energy within an environment surrounding the transceiver system 10. In addition, because spectral sensing is performed at the same time as signal transmission, some of the transmitted RF signal will also be detected at the receive antenna 26. This is because an undesired coupling (leakage) path 28 will typically exist between the antennas 24, 26. As will be described in greater detail, a majority of this transmit signal component of the received energy will be cancelled within the transceiver system 10. In some implementations, some degree of isolation will be achieved between the transmit antenna 24 and the receive antenna 26 by proper location of the antennas 24, 26 within the transceiver system 10 (which may be implemented within a single box or platform in some embodiments). This may involve, for example, locating the two antennas as far from one another as possible within the space provided. However, in some embodiments, sufficient cancellation of the RF transmit signal may be achieved without optimal antenna placement within the transceiver 10.

In the illustrated embodiment, the transceiver system 10 cancels the RF transmit signal component of the receive energy using a two stage process. Analog RF cancellation is performed in the RF canceller 16 before the receive energy reaches the RF receiver 14. Digital cancellation is then implemented in the processor 18 to remove remnants of the transmit signal that remain after RF cancellation. Although illustrated with two cancellation stages, it should be appreciated that additional stages may be used in other embodiments (e.g., one or more additional RF cancellation stages and/or one or more additional digital cancellation stages).

The RF coupler 22 is operative for coupling a portion of the RF transmit signal from the transmit path 21 to the RF canceller 16. Any type of RF coupler may be used. The RF canceller 16 uses the coupled portion of the transmit signal to perform RF cancellation. In some embodiments, the RF canceller 16 may include multiple analog cancellation stages to permit RF cancellation over the entire transmit signal bandwidth (e.g., 20 MHz in one implementation). In at least one embodiment, the RF canceller 16 will cancel enough of the RF transmit signal from the composite receive signal to maintain linear operation within the RF receiver 14. The RF receiver 14 will then process the RF cancelled receive signal to generate a digital baseband signal at an output thereof (i.e., at an output of an analog-to-digital converter (ADC) associated with the RF receiver 14).

The processor 18 receives the digital baseband signal output by the RF receiver 14 and performs digital cancellation on the signal to remove (or reduce) remnants of the RF transmit signal that were left by the RF canceller 16. As will be described in greater detail, the processor 18 may perform this digital cancellation on a subcarrier-by-subcarrier basis (i.e., the processor 18 may adjust the amplitude and phase associated with individual subcarriers of the baseband receive signal independently of other subcarriers). As shown in FIG. 2, in addition to the RF cancelled digital baseband signal received from the RF receiver 14, the processor 18 may also obtain a copy of the digital baseband input signal applied to the RF transmitter 12 to generate the RF transmit signal. The processor 18 may process the digital baseband input signal using a transfer function that is associated with the hardware between the analog-to-digital converter of the transmitter and the digital-to-analog converter in of the receiver, which includes the RF cancellation hardware of the transceiver 10, to develop a digital cancellation signal. The digital cancellation signal may then be used by the processor 18 to cancel transmit signal remnants within the baseband receive signal. Thus, the digital cancellation signal may be derived directly from the transmit digital baseband, rather than from a down-converted version of the transmitted RF signal. As will be appreciated, this feature supports transmit noise cancellation near the transmit frequency. In some implementations, the digital cancellation may include independent cancellation of hundreds of individual tones (although the number of tones cancelled will typically be implementation specific). As will be appreciated, in some embodiments, less than all of the available tones may be cancelled.

In some embodiments, a calibration procedure may be implemented for the RF transceiver 10 to determine the transfer function to be used by the processor 18. In general, the transfer function should characterize the transceiver hardware from the transmit baseband (e.g., the input of the digital-to-analog converter (DAC) of the RF transmitter 12) to the receive baseband (e.g., the output of the ADC of the RF receiver 14). This transfer function may include the effects of both the RF canceller 16 and the transmit signal leakage path 28. The transfer function may indicate, for example, changes in amplitude and phase within the transceiver hardware for each of (or a subset of) the subcarriers of the multicarrier signal. Once determined, the transfer function may be stored within, for example, memory 20. The calibration of the end-to-end losses and delays for individual sub-carriers (or tones) may be performed in an off-line, static manner or in a dynamic, automated fashion in different implementations.

In some embodiments, the transceiver system 10 of FIG. 2 may be implemented as part of a Mobile Ad hoc Interoperability Network Gateway (MAINGATE) family of high-performance radios. MAINGATE radios feature a two-channel, high-data rate, next-generation network-centric radio, which enables seamless battlefield connectivity using the Raytheon Next Generation Mobile Ad hoc Networking Waveform (NMW) and a gateway system. The transceiver system 10 may alternatively be implemented in other systems and radios. In a MAINGATE application, an RF transmit signal may include 12 frequency segments placed independently within the operational bandwidth. Each frequency segment is 1.2 MHz wide. The segments may be symmetric about zero Hertz (Hz) and the tone at zero Hz may remain unused. As will be appreciated, many alternative signaling schemes may be used in other implementations.

The processor 18 of FIG. 2 may include any type of digital processing device or combination of devices that is capable of performing the underlying processing tasks. This may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, a processor complex, and/or others, including combinations of the above. The memory 20 of FIG. 2 may include any device, system, structure, medium, or combination thereof that is capable of storing electronic instructions and/or data in a digital form. In various embodiments, techniques and systems described herein may be implemented using any combination of hardware, software, and firmware.

Figure 3:
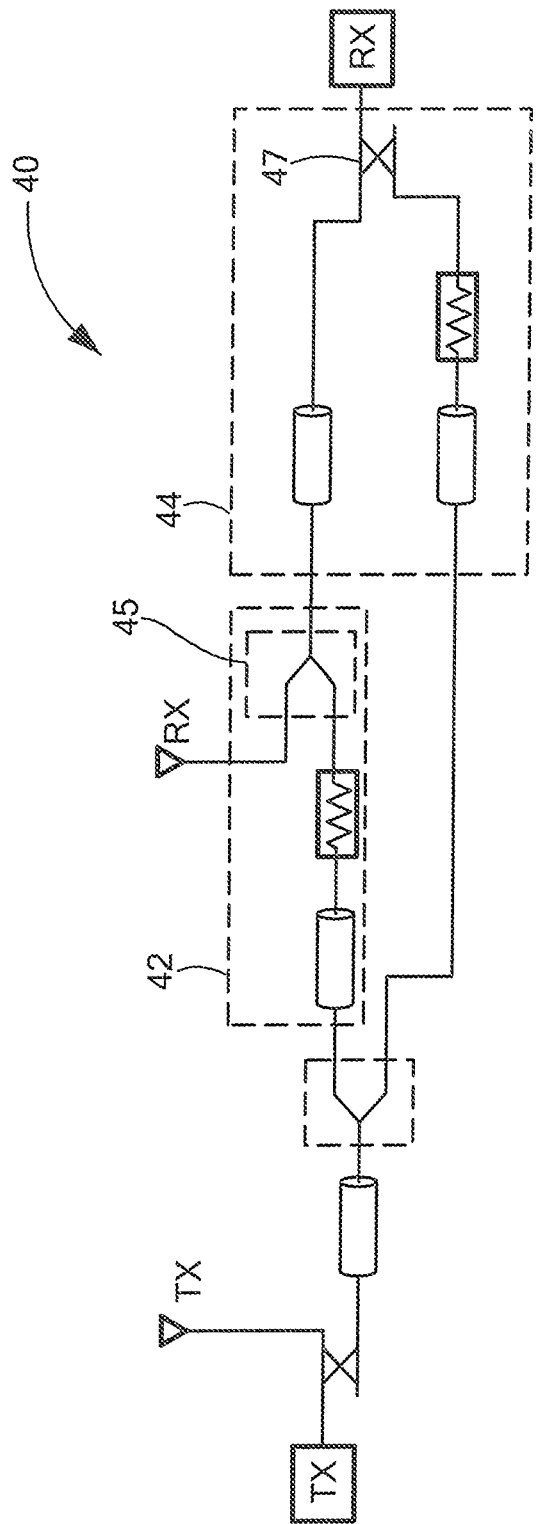
FIG. 3 is a block diagram illustrating an exemplary multistage RF canceller architecture in accordance with an embodiment.
Figure 4:
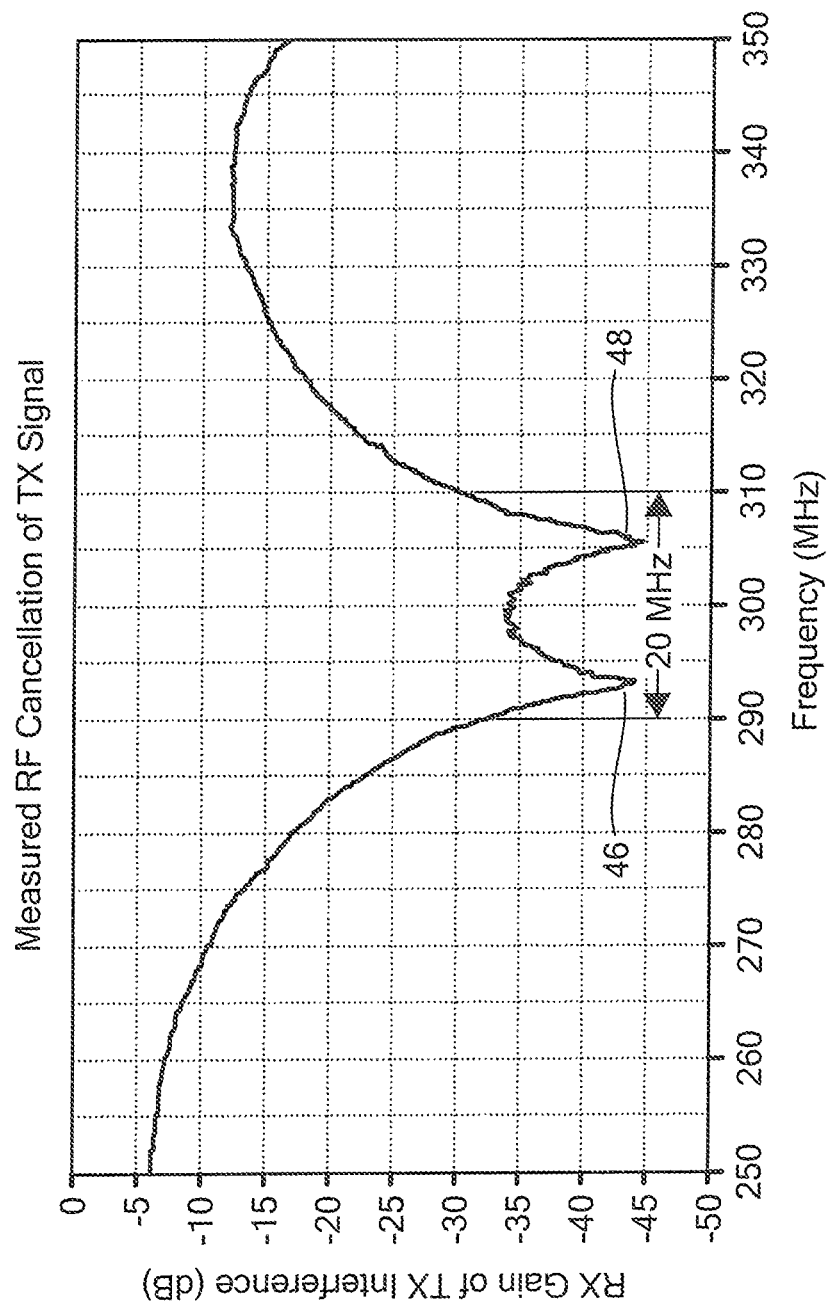
FIG. 4 is a plot showing measured RF transmit signal cancellation over a 20 MHz band in accordance with an embodiment.

FIG. 3 is a block diagram illustrating an exemplary multi-stage RF canceller architecture 40 that may be used to perform RF cancellation over a relatively wide bandwidth (e.g., 20 MHz in the illustrated arrangement) in accordance with an embodiment. As shown, the RF canceller 40 includes a first cancellation stage 42 and a second cancellation stage 44. The first stage 42 generates a first null in a transfer function of the RF canceller 40 and the second stage 44 generates a second null. The overall effect of the multiple stages of cancellation is to provide cancellation over a wider bandwidth that would normally be achieved within an analog canceller. In the illustrated arrangement, the first stage 42 is implemented with an equal combiner 45 (insertion loss of 3 dB) and the second stage 44 is implemented with a 10 dB coupler 47 (insertion loss of 1 dB) to perform the respective cancellation. When used with tunable delays, the first stage 42 can be migrated to a 10 dB coupler as there will be sufficient excess interference signals for reference. FIG. 4 is a plot illustrating RF transmit signal cancellation measured over a 20 MHz bandwidth for the multi-stage RF canceller architecture 40 of FIG. 3. As shown, the cancellation response includes two nulls 46, 48 corresponding to the first and second cancellation stages. Although illustrated with two RF cancellation stages, it should be appreciated that 3 or more stages of analog RF cancellation may be used in some embodiments.

Figure 5:
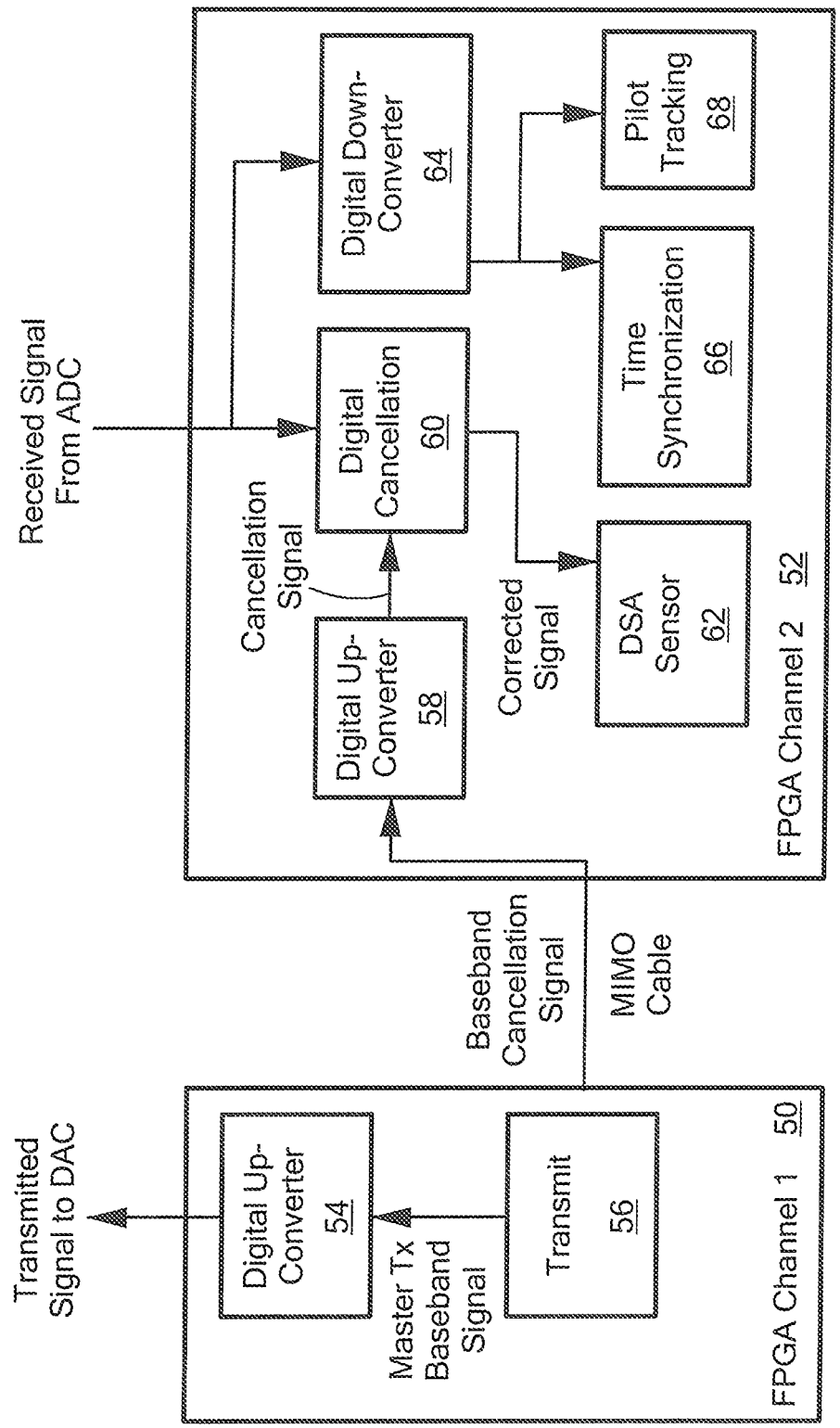
FIG. 5 is a block diagram illustrating exemplary digital processing functionality within a transceiver system in accordance with an embodiment.

FIG. 5 is a block diagram illustrating exemplary digital processing functionality within an RF transceiver system in accordance with an embodiment. As shown, the digital processing may be implemented within multiple FPGA channels associated with a transceiver system, although other types of digital processing hardware may be used in other implementations. In the illustrated arrangement, a common FPGA build is used to provide both a first FPGA channel 50 (i.e., FPGA Channel 1) and a second FPGA channel 52 (i.e., FPGA Channel 2). The digital processing arrangement of FIG. 5 may be used within, for example, a MAINGATE radio that uses an NMW waveform. The NMW waveform supports 2×2 multiple input, multiple output (MIMO) that is capable of simultaneously generating two transmission signals, a master signal and a slave signal. When implementing simultaneous transmit and receive (STAR), a MAINGATE radio may not use MIMO. Instead, the radio may use the master signal to transmit on a first radio channel and the slave signal to simultaneously generate a digital cancellation signal. Thus, as shown in FIG. 5, the first FPGA channel 50 may include a digital up-conversion function 54 to provide digital up conversion for a master baseband transmit signal. This up converted signal may be provided to a DAC associated with a corresponding RF transmitter to allow an RF transmit signal to be generated. The first FPGA channel 50 may also include a transmit function 56 to digitally implement a transfer function of the analog hardware within the transceiver between the DAC for radio channel 1 and the ADC for radio channel 2. The transmit function 56 processes the master baseband transmit signal to generate a baseband cancellation signal for use in digital cancellation. The baseband cancellation signal may be output on a MIMO cable associated with the FPGA.

The second FPGA channel 52 may include another digital up conversion function 58 to up convert the baseband cancellation signal received from the first FPGA channel 50. The up converted cancellation signal may then be delivered to a digital cancellation function 60 to perform digital cancellation on a received signal. In some embodiments, the cancellation signal may include amplitude and phase information for each subcarrier (or tone) of the underlying multicarrier signal for use in cancellation. In some implementations, cancellation information may only be provided for a subset of the subcarriers in the system. The digital cancellation function 60 may use the amplitude and phase information from the cancellation signal to correct the data associated with each corresponding subcarrier. The corrected signals may then be delivered to a DSA sensor function 62 to provide DSA functionality for the transceiver.

The second FPGA channel 52 may also include a digital down-conversion function 64 to down convert a signal received from the ADC of the RF receiver. The down converted digital signal may be provided to a time synchronization function 66 and a pilot tracking function 68. The digital down conversion function 64, the time synchronization function 66, and the pilot tracking function 68 may be used by the transceiver during a calibration process to develop or update the transfer function of the system. These functions 64, 66, 68 may not be used during digital cancellation operations. Likewise, the digital cancellation function 60 and the DSA sensor function 62 may not be used during calibration operations within the transceiver.

In at least one embodiment, the transfer function of the analog hardware within the RF transceiver will be empirically determined. During simulation testing, a sync point may be offset such that there is no phase rotation in the averaged received pilot tones. During a later calibration step, this sync point time offset may be included when determining tonal phase rotations and amplitude changes. In some embodiments, during time offset calibration, one-segment packets may be used with the left tone of the acquisition segment at tone index 1. In other embodiments, packets with more than one segment (e.g., up to 12 segments or more) may be used during calibration. During calibration, the second radio channel may execute received packets with self discovery enabled. The time delay of the analog hardware transfer function may be measured by first setting up the second FPGA channel to drive two discrete signals out of the radio. One of the signals may be a fixed time from the TDMA slot boundary and indicate the time at which synchronization occurs in simulation. The second signal may indicate the time at which synchronization occurs on the receive channel. The difference in time between these two signals may be measured in the lab as the time delay of the analog hardware transfer function. It is expected that there will be a variance in the time delay of the analog hardware transfer function. Therefore, when the time delay is measured, the range of the measured values may be noted.

During the calibration procedure, the tone amplitude and phase offsets for the analog hardware transfer function may be empirically determined separately for the odd and even pilot tones. For the odd tones, the master transmitter may be used. For the even tones, the slave transmitter may be used. During calibration, the outputs of the wideband and in-band automatic gain control (AGC) units may be held at constant values following signal acquisition. The constant values may be typical values for package exchange. Over an entire received packet, the average in-phase and quadrature component of each of the pilot tones may be computed. The analog and phase offsets of the analog hardware transfer function may be determined by averaging the in-phase and quadrature components of the pilot tones over several packets. The results are the amplitude and phase offsets for the pilot tones of the analog hardware transfer function. Since each data tone has less transmitted power than a pilot tone, the amplitude of the transfer function needs to be proportionately scaled down for the data tones.

The digital cancellation signal may be computed as the master signal with each tone offset by the amplitude and phase of the analog hardware transfer function. The digital cancellation signal and the digital received signal may be extracted with no sensing signal applied. The two signals may then be compared to validate the computed cancellation signal. In at least one implementation, the cancellation signal is generated at 51.2 mega samples per second (MSPS) and the received signal is generated at 102.4 MSPS. When operational, the second radio channel may execute DSA sensing. The analog hardware time delay may be computed on a packet by packet basis. It may be assumed that the delay is within the range measured above. The tone delay may be measured from the TDMA slot boundary. During the first part of the packet, before the DSA sensor is enabled, the digital cancellation function may compute the power of the corrected signal for various time delays. The time delay that creates the smallest signal power may be used for digital cancellation for the DSA sensor during the remainder of the packet. The corrected signal may be computed as the difference between the received signal and the cancellation signal. In at least one embodiment, a DSP may be used to enable digital cancellation on a packet-by-packet basis, although other processor types may alternatively be used.

Figure 6:
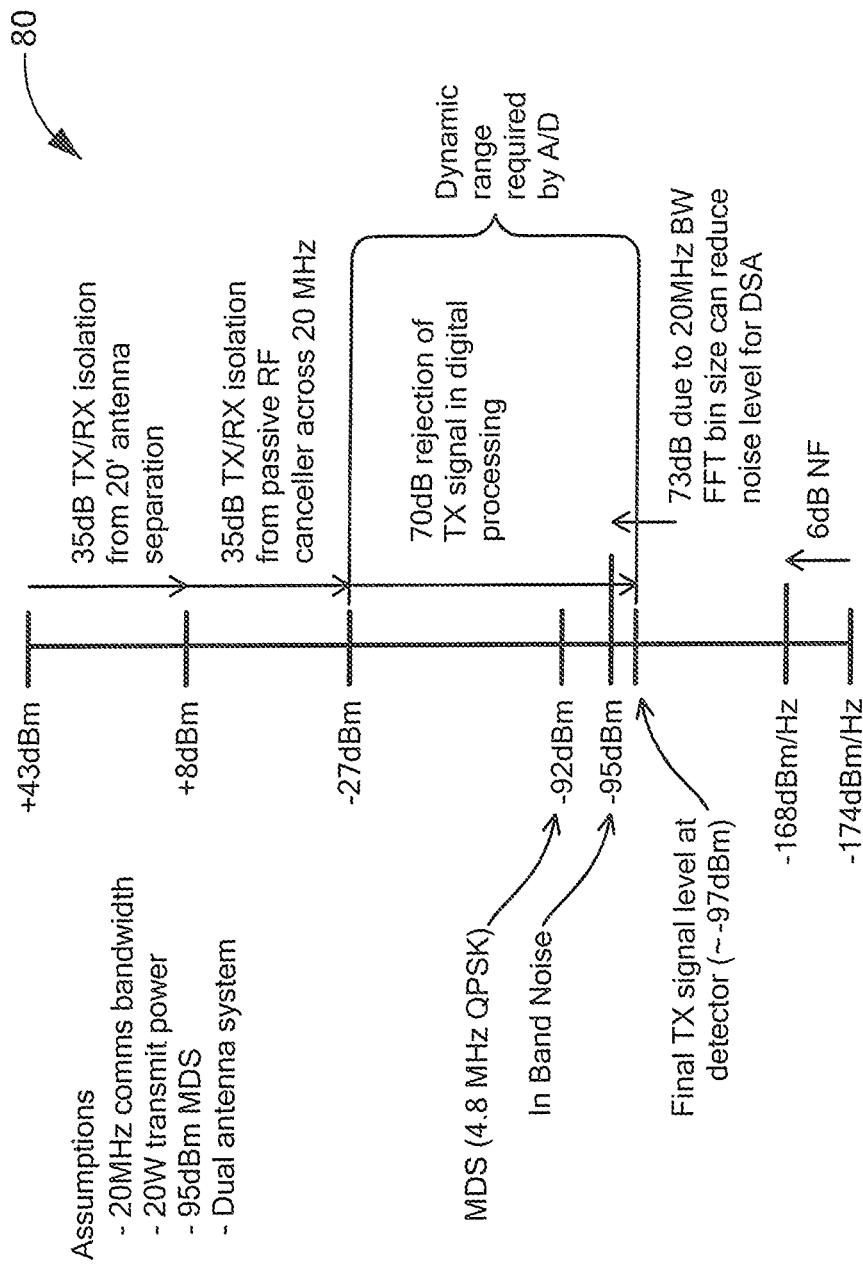
FIG. 6 is a diagram illustrating exemplary signal levels in an RF transceiver performing RF transmit signal cancellation in accordance with an embodiment.

FIG. 6 is a diagram illustrating an exemplary signal level profile 80 for an RF transmit signal cancellation procedure in accordance with an embodiment. The diagram assumes a 20 MHz communication bandwidth, a transmit power of 20 Watts (+43 dBm), and a minimum detectable signal (MDS) of −95 dBm. As shown, 35 dB of transmit/receive isolation is achieved by using a 20 foot antenna separation. An additional 35 dB of transmit/receive isolation is achieved using a passive RF canceller across 20 MHz. Digital processing then provides 70 dB of additional transmit signal rejection. This brings the transmit signal level at the detector to about −97 dBm.

Figure 7:
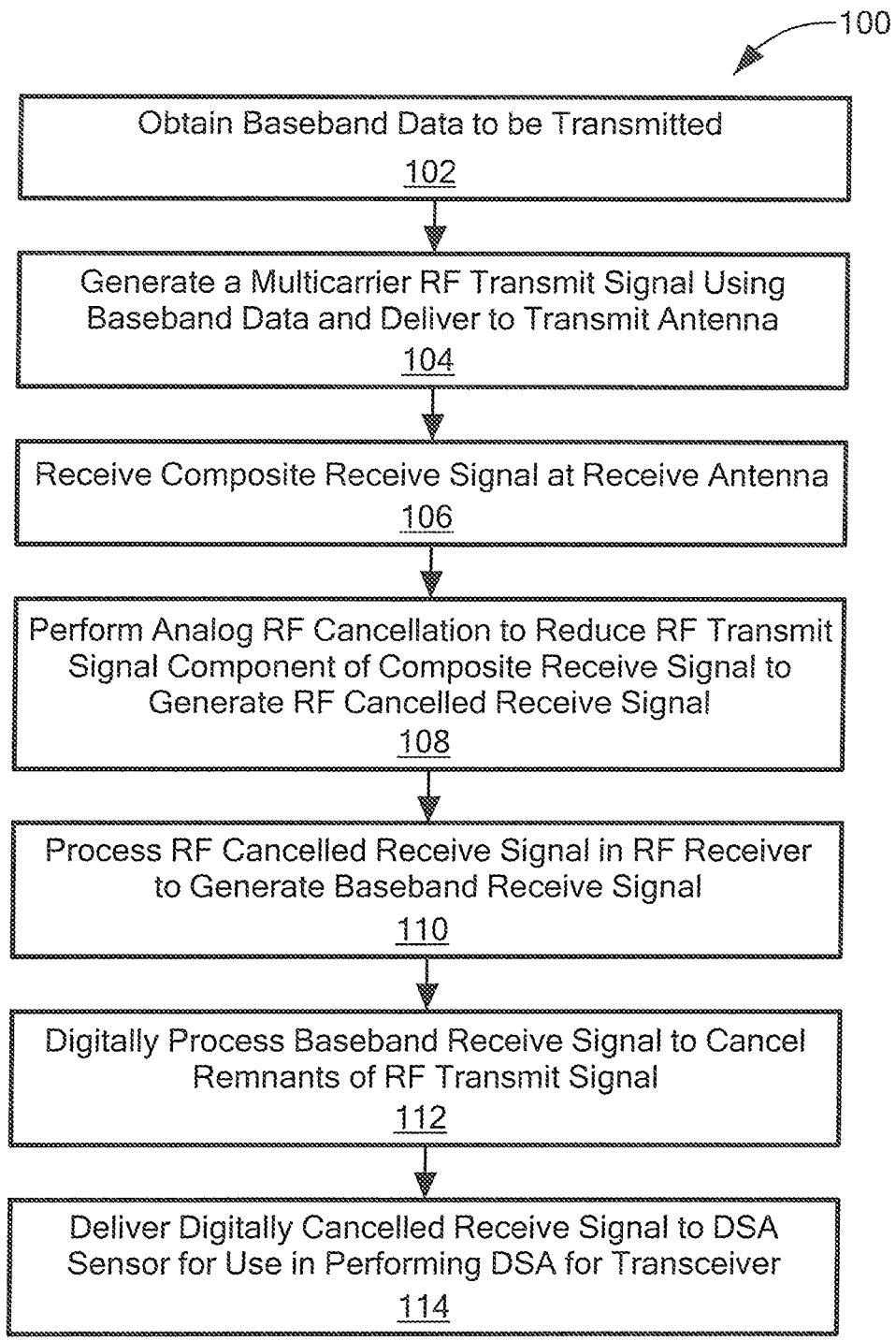
FIG. 7 is a flowchart illustrating an exemplary method for implementing dynamic spectrum access (DSA) in a multicarrier transceiver in accordance with an embodiment.

FIG. 7 is a flow diagram showing a process for performing dynamic spectrum access (DSA) in a multicarrier transceiver in accordance with an embodiment.

The rectangular elements (typified by element 102 in FIG. 7) are herein denoted "processing blocks" and may represent computer software instructions or groups of instructions. It should be noted that the flow diagram of FIG. 7 represents one exemplary embodiment of a design described herein and variations in such a diagram, which generally follow the process outlined, are considered to be within the scope of the concepts, systems and techniques described and claimed herein.

Alternatively, the processing blocks may represent operations performed by functionally equivalent circuits such as a digital signal processor circuit, an application specific integrated circuit (ASIC), or a field programmable gate array (FPGA). The flow diagram does not depict the syntax of any particular programming language. Rather, the flow diagram illustrates functional information one of ordinary skill in the art may use to practice features described herein. It should be noted that many routine program elements, such as initialization of loops and variables and the use of temporary variables are not shown. It should be appreciated by those of ordinary skill in the art that, unless otherwise indicated herein, the particular sequence described in the flow diagram is illustrative only and can be varied without departing from the spirit of the concepts described and/or claimed herein. Thus, unless otherwise stated, the described processes are unordered meaning that, when possible, the sequences shown in FIG. 7 can be performed in any convenient or desirable order.

Turning now to FIG. 7, baseband data to be transmitted is first obtained (block 102). The baseband data is used to generate a multicarrier RF transmit signal which is delivered to a transmit antenna for transmission (block 104). A composite receive signal is received from an exterior environment at a receive antenna (block 106). The composite signal may be received during a period of time when the RF transmit signal is being transmitted. Thus, the composite signal may include a component associated with the RF multicarrier transmit signal as well as other components associated with other transmitting nodes in the surrounding environment.

Analog RF cancellation is performed to reduce the RF transmit signal component in the composite receive signal (block 108). The RF cancellation process may use, for example, a replica of the RF transmit signal coupled from a transmit path within the transceiver. In some embodiments, the RF cancellation will be passive. In this manner, the RF cancellation can be effective on noise, which will be a benefit when the receive channel is offset in frequency from the transmit channel. This can enable the DSA sensor to see below the level of the broadband output noise of the transmitter at the receiver input, which makes the cancellation approach even more useful. Noise cancellation does not extend to the digital domain, however, as there may be other uncorrelated noise sources in the path (e.g. quantization, amplification, mixing phase noise, etc).

The RF receive signal resulting from the RF cancellation may then be processed in an RF receiver to generate a digital receive signal (block 110). In at least one embodiment, sufficient RF cancellation will be performed to maintain the RF receiver in a linear operational region. That is, the RF cancellation process will reduce the level of the composite receive signal to a point where it does not drive the RF receiver into a non-linear region. However, the RF cancellation will not necessarily eliminate all transmit signal energy within the composite receive signal.

The digital receive signal output by the RF receiver is subsequently digitally processed to remove remnants of the RF transmit signal from the received signal (block 112). This digital cancellation may be performed on a subcarrier-by-subcarrier basis. In some implementations, digital cancellation is performed for all subcarriers (or tones) of the multi-carrier signal (although digital cancellation for only a subset of the subcarriers may be performed in some implementations). The digital cancellation may involve, for example, modifying an amplitude and a phase associated with individual subcarriers of the digital receive signal based on knowledge of a transfer function associated with the analog RF cancellation hardware and the signal path from the transmit output to the receiver input.

The signal resulting from the digital cancellation should include an accurate representation of the spectral environment around the transceiver, without a large component associated with the RF transmit signal (although a small remnant of the transmit signal may remain in some implementations). This digitally cancelled signal may then be delivered to a sensor for use in performing DSA for the transceiver (block 114). The performance of DSA may involve, for example, determining new transmit parameters for the RF transceiver based on the content of the spectral environment.

The digital processing of the receive signal may involve first generating a digital cancellation signal by applying a copy of the baseband transmit data to a transfer function that is representative of a portion of the transceiver between transmit baseband and receive baseband. The transfer function may be stored within a memory of the transceiver. The transfer function may be developed during a calibration procedure in the transceiver and may be periodically or continually updated during the operational lifetime of the transceiver. In some embodiments, the calibration procedure may be performed in real time during communication activity, although offline calibration may alternatively be used.

The techniques and systems described herein may be implemented in any of a variety of different forms. For example, features described herein may be embodied within cellular telephones and other handheld wireless communicators; personal digital assistants having wireless capability; laptop, palmtop, desktop, and tablet computers having wireless capability; pagers; satellite communicators; cameras having wireless capability; audio/video devices having wireless capability; network interface cards (NICs) and other network interface structures; integrated circuits; wireless access points; base stations; subscriber stations; military communications transceivers, network servers; as instructions and/or data structures stored on tangible, non-transient machine readable media, and/or in other formats. Examples of different types of tangible, non-transient machine readable media that may be used include floppy diskettes, hard disks, optical disks, compact disc read only memories (CD-ROMs), magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data. As used herein, the phrases "non-transient machine readable media," "non-transient computer readable media," and the like are not intended to encompass signals per se.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A method comprising:
    obtaining baseband transmit data;
    generating a multicarrier transmit signal using the baseband transmit data;
    transmitting the multicarrier transmit signal from a transmit antenna;
    receiving a composite receive signal at a receive antenna, the composite receive signal having a component associated with the multicarrier transmit signal;
    performing analog RF cancellation to reduce a level of the multicarrier transmit signal component of the composite receive signal to generate an RF cancelled receive signal;
    processing the RF cancelled receive signal in an RF receiver to generate a digital receive signal; and
    performing digital cancellation on the digital receive signal to reduce remnants of the multicarrier transmit signal therein, wherein performing digital cancellation includes performing cancellation on a subcarrier by subcarrier basis, wherein performing digital cancellation comprises modifying amplitudes and phases associated with individual subcarriers of the digital receive signal in accordance with a digital cancellation signal.

2. The method of claim 1, wherein performing analog RF cancellation includes cancelling a sufficient portion of the multicarrier transmit signal component of the composite signal to maintain linearity of the RF receiver.

3. The method of claim 1, wherein performing digital cancellation includes generating the digital cancellation signal.

4. The method of claim 3, wherein generating the digital cancellation signal includes:
    acquiring a copy of the baseband transmit data;
    obtaining a transfer function that is descriptive of transceiver hardware between transmit baseband and receive baseband; and
    digitally processing the baseband transmit data using the transfer function to generate the digital cancellation signal.

5. The method of claim 4, wherein:
obtaining a transfer function includes retrieving the transfer function from memory.

6. The method of claim 4, wherein:
obtaining a transfer function includes generating the transfer function using a calibration procedure.

7. The method of claim 1, wherein:
performing digital cancellation includes performing digital cancellation for all subcarriers of the digital receive signal.

8. The method of claim 1, wherein:
performing digital cancellation includes performing digital cancellation for a subset of the subcarriers of the digital receive signal.

9. The method of claim 1, wherein:
performing analog RF cancellation includes performing cancellation in multiple RF cancellation stages to cover a full bandwidth of the multicarrier transmit signal.

10. The method of claim 1, wherein:
generating a multicarrier transmit signal includes generating an orthogonal frequency division multiplexing (OFDM) symbol having a predetermined number of data subcarriers.

11. A method of processing signals received by a receiver, the method comprising:
performing, by an RF canceller of the receiver, radio frequency (RF) cancellation on a composite receive signal to reduce a multicarrier transmit signal component in the composite receive signal and to generate an RF cancelled receive signal;
processing the RF cancelled receive signal by a processor of the receiver to generate a digital receive signal, wherein performing RF cancellation includes reducing the multicarrier transmit signal component in the composite receive signal a sufficient amount to maintain linear operation in the RF receiver;
performing, by the processor, digital cancellation on the digital receive signal to reduce remnants of the multicarrier transmit signal component in the digital receive signal by modifying amplitudes and phases associated with individual subcarriers of the digital receive signal in accordance with a digital cancellation signal; and
providing the cancelled digital receive signal to a sensor of the receiver for performing dynamic spectrum access (DSA).

12. The method of claim 11, wherein performing digital cancellation includes performing digital cancellation on a subcarrier by subcarrier basis.

13. The method of claim 11, wherein performing digital cancellation includes generating a digital cancellation signal using a copy of baseband transmit data used to generate a multicarrier transmit signal and a transfer function descriptive of transceiver hardware using to perform RF cancellation.

14. The method of claim 11, wherein performing RF cancellation includes performing passive RF cancellation.

15. A transceiver for use in a multicarrier system, comprising:
a radio frequency (RF) transmitter to generate a multicarrier transmit signal for transmission into a wireless channel using baseband transmit data;
a transmit antenna to transmit the multicarrier transmit signal;
a receive antenna to receive a composite receive signal from an exterior environment, the composite receive signal having a component associated with the multicarrier transmit signal;
an RF canceller to reduce a level of the multicarrier transmit signal component in the composite receive signal to generate an RF cancelled receive signal;
an RF receiver to process the RF cancelled receive signal to generate a digital receive signal; and
a digital processor configured to perform digital cancellation on the digital receive signal to remove remnants of the multicarrier transmit signal therefrom, wherein the digital cancellation is performed on a subcarrier-by-subcarrier basis by modifying amplitudes and phases associated with individual subcarriers of the digital receive signal in accordance with a digital cancellation signal.

16. The transceiver of claim 15, wherein the digital processor is configured to generate the digital cancellation signal using a copy of the baseband transmit data used to generate the multicarrier transmit signal and to use the digital cancellation signal to perform the digital cancellation.

17. The transceiver of claim 16, wherein the digital processor is configured to
generate the digital cancellation signal by digitally processing the baseband transmit data using a transfer function descriptive of processing hardware within the transceiver.

18. The transceiver of claim 15, wherein the RF canceller is configured to reduce a level of the multicarrier transmit signal component in the composite receive signal to a level that maintains linear operation in the RF receiver.

19. The transceiver of claim 15, wherein the digital processor is configured to perform digital cancellation for all of the data subcarriers of the digital receive signal.

20. The transceiver of claim 15, wherein
the transmit antenna and the receive antenna are located a sufficient distance from one another to maintain a desired level of isolation there between.

21. A method comprising:
obtaining baseband transmit data;
generating a multicarrier transmit signal using the baseband transmit data;
transmitting the multicarrier transmit signal from a transmit antenna;
receiving a composite receive signal at a receive antenna, the composite receive signal having a component associated with the multicarrier transmit signal;
performing analog RF cancellation to reduce a level of the multicarrier transmit signal component of the composite receive signal to generate an RF cancelled receive signal;
processing the RF cancelled receive signal in an RF receiver to generate a digital receive signal; and
performing digital cancellation on the digital receive signal to reduce remnants of the multicarrier transmit signal therein, wherein performing digital cancellation includes performing cancellation on a subcarrier by subcarrier basis,
wherein performing analog RF cancellation includes performing cancellation in multiple RF cancellation stages to cover a full bandwidth of the multicarrier transmit signal.

22. A method of processing signals received by a receiver, the method comprising:
performing, by an RF canceller of the receiver, radio frequency (RF) cancellation on a composite receive signal to reduce a multicarrier transmit signal component in the composite receive signal and to generate an RF cancelled receive signal by performing cancellation in multiple RF cancellation stages to cover a full bandwidth of the multicarrier transmit signal;

processing the RF cancelled receive signal by a processor of the receiver to generate a digital receive signal, wherein performing RF cancellation includes reducing the multicarrier transmit signal component in the composite receive signal a sufficient amount to maintain linear operation in the RF receiver;

performing, by the processor, digital cancellation on the digital receive signal to reduce remnants of the multicarrier transmit signal component in the digital receive signal; and providing the cancelled digital receive signal to a sensor of the receiver for performing dynamic spectrum access (DSA).

23. The method of claim 22, wherein performing digital cancellation comprises modifying amplitudes and phases associated with individual subcarriers of the digital receive signal in accordance with a digital cancellation signal.

24. The method of claim 11, wherein performing the radio frequency (RF) cancellation comprises performing cancellation in multiple RF cancellation stages to cover a full bandwidth of the multicarrier transmit signal.

25. A transceiver for use in a multicarrier system, comprising:
- a radio frequency (RF) transmitter to generate a multicarrier transmit signal for transmission into a wireless channel using baseband transmit data;
- a transmit antenna to transmit the multicarrier transmit signal;
- a receive antenna to receive a composite receive signal from an exterior environment, the composite receive signal having a component associated with the multicarrier transmit signal;
- an RF canceller to reduce a level of the multicarrier transmit signal component in the composite receive signal to generate an RF cancelled receive signal by performing cancellation in multiple RF cancellation stages to cover a full bandwidth of the multicarrier transmit signal;
- an RF receiver to process the RF cancelled receive signal to generate a digital receive signal; and
- a digital processor configured to perform digital cancellation on the digital receive signal to remove remnants of the multicarrier transmit signal therefrom, wherein the digital cancellation is performed on a subcarrier-by-subcarrier basis.

26. The transceiver of claim 25, wherein the digital processor is configured to perform the digital cancellation digital by modifying amplitudes and phases associated with individual subcarriers of the digital receive signal in accordance with a digital cancellation signal.

27. The transceiver of claim 15, wherein (RF) canceller is configured to reduce the level of the multicarrier transmit signal by performing cancellation in multiple RF cancellation stages to cover a full bandwidth of the multicarrier transmit signal.

* * * * *